(12) United States Patent
Lou et al.

(10) Patent No.: US 7,532,493 B2
(45) Date of Patent: May 12, 2009

(54) POWER SUPPLY WITH LOW STANDBY LOSS

(75) Inventors: Junshan Lou, Shanghai (CN); Jiangtao Feng, Shanghai (CN); Hongjian Gan, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 182 days.

(21) Appl. No.: 11/319,381

(22) Filed: Dec. 29, 2005

(65) Prior Publication Data

US 2007/0115695 A1     May 24, 2007

(30) Foreign Application Priority Data

Nov. 21, 2005    (TW) .............................. 94140837 A

(51) Int. Cl.
    *H02J 1/10*      (2006.01)
    *G05F 1/00*      (2006.01)

(52) U.S. Cl. ........................... 363/65; 323/272; 323/284

(58) Field of Classification Search ................. 323/222, 323/282, 284, 272; 363/21.12, 21.04
See application file for complete search history.

(56) References Cited

U.S. PATENT DOCUMENTS

| | | | | |
|---|---|---|---|---|
| 5,404,092 | A * | 4/1995 | Gegner | 323/207 |
| 5,719,754 | A * | 2/1998 | Fraidlin et al. | 363/17 |
| 5,999,421 | A * | 12/1999 | Liu | 363/21.15 |
| 6,088,244 | A * | 7/2000 | Shioya et al. | 363/21.07 |
| 6,400,589 | B2 * | 6/2002 | Abo et al. | 363/65 |
| 6,466,458 | B2 * | 10/2002 | Zhang et al. | 363/17 |
| 6,483,731 | B1 * | 11/2002 | Isurin et al. | 363/125 |
| 6,800,961 | B2 * | 10/2004 | Basso | 307/43 |
| 7,092,266 | B2 * | 8/2006 | Frank | 363/65 |

\* cited by examiner

*Primary Examiner*—Jessica Han
*Assistant Examiner*—Emily Pham
(74) *Attorney, Agent, or Firm*—Birch, Stewart, Kolasch & Birch, LLP

(57) ABSTRACT

The present invention discloses a power supply device with low standby loss. The power supply device comprises a main power converter and an auxiliary power converter. The main power converter comprises a bulk capacitor. The main power converter connects parallelly with the auxiliary power converter. When the power supply device is in a standby mode, the main converter is turned off and the auxiliary converter provides the output to the outputting load and the bulk capacitor. Moreover, when the power supply device is in a normal mode, the main converter and the auxiliary converter together provide the output to an outputting load. Under a normal mode, the main converter provides most of the power and the auxiliary converter operates in a power-limited finite value such that the topology of the power supply device achieves a low standby loss.

12 Claims, 6 Drawing Sheets

POWER SUPPLY WITH LOW STANDBY LOSS

BACKGROUND OF THE INVENTION

1. Field of the Invention

The present invention relates to a switching mode power supply, and more particularly, the present invention relates to the power supply with low standby loss and a main power converter connected parallelly with an auxiliary power converter of the power supply.

2. Description of the Related Art

In the design of a switching mode power source, a system requires high switching efficiency, high power density, high reliability, low production cost and quick dynamic response to a loading. With the worldwide campaign for saving energy, all switching mode power sources are demanded to have low standby power wastage. In this regard, various international organizations including the International Energy Association (IEA), the United States and many European countries have proposed or are planning a set of related standards to limit the power consumed by an electronic product using a switching mode power source in a standby mode.

The standard recommended by IEA and European countries includes a power source with a labeled input rating of 75 W or less, the non-loaded loss should be smaller than 0.75 W after 1 Jan. 2003. However, it is believed that more stringent standard will be established for large power sources in the future.

Currently, some of the methods for reducing standby power consumption include the following: 1. Lowering the switching frequency of a converter in the standby mode—Because a large portion of the energy consumed in the standby mode is the switching of power device, lowering the switching frequency can effectively reduce switching waste and hence reduces power waste in the standby mode. However, if this method is deployed to save energy, audio-noise will appear when the switching frequency is lowered to 20 KHz or below. Thus, some manufacturers developing this type of energy-saving control chips have to deploy frequency jolting and peak current limitation techniques to weaken or reduce noise signals. In addition, the method of reducing the switching frequency is only applicable to a pulse width modulation (PWM) converter. 2. Switches being operated intermittently—Through controlling the voltage differential amplifying signal or directly controlling the output voltage, the converters can operate intermittently in the standby mode. With this setup, the switching frequency per unit time is lowered and hence the switching waste is reduced. However, the ripple wave of the output voltage in the standby mode is considerably large and acoustic frequency noise signal is more likely to appear. Moreover, this method can be applied to a PWM converter and a resonance converter only. 3. Operating using small-power switches—In general, the switching loss and driving loss is related to the parameters of parasitic capacitor in a power device. For example, a small-power switch has a smaller parasitic capacitance. Hence, using a small-power switch in the standby mode can reduce the switching loss and driving loss of a converter.

Although all the aforementioned methods can reduce power loss in the standby mode, they can hardly meet some of the more stringent requirements for reducing power loss in switching mode power sources with a larger output power. For example, Dell, a U.S. Corporation, demands a power loss of 1 W for a 150 W device, which means when the power source outputs 0.5 W to a loading, the input power cannot exceed 1 W. Besides, the power source needs to have high switching efficiency, high power density, high reliability, low production cost and quick dynamic response to a loading. For high power application, in order to meet the requirement for high switching efficiency and high power density, the power supply adapts two-stage structure including a front-end with PFC connected to a DC/DC converter. Therefore, the switching loss and the driving loss of the circuits will be enormously increased owing to increasingly number of semiconductor switching devices and specifications of voltage and current of the semiconductor switching devices. Moreover, control circuits had varied more complicated accompanying with complicated circuits to need more power consumption. The above-mentioned three parts occupy most of the standby loss.

Therefore, in view of the above-mentioned drawbacks of prior art, a new scheme can be provided to achieve high switching efficiency, low cost, fast dynamic response to a load and stringent demand of standby loss.

SUMMARY OF THE INVENTION

In view of the drawbacks of prior art, switch mode power having high standby loss, the present invention provides a power supply with low standby loss that a main power converter connects parallelly with an auxiliary power converter.

Main objective of the present invention is to provide a converter topology. In the standby mode, the main power converter is disabled such that all output power is provided solely through the auxiliary power converter. In the meantime, the auxiliary power converter may maintain the bus capacitor voltage for meeting the demand of dynamic response to a load.

Another objective of the present invention is to provide a converter topology. Under a normal mode, the main power converter and the auxiliary power converter together supply power. In the meantime, most of the output power is provided by the main power converter and the maximum output power of the auxiliary power converter is confined to or less than a limited value.

Therefore, converter topology of the present invention may achieve high switching efficiency, low cost, fast dynamic response to the load and meet the demand of severe low standby loss.

In accordance with the purpose of the present invention, the invention provides a power supply. The power supply comprises a main power converter, an auxiliary power converter and a control circuit. The main power converter connects to an input power source, having at least one output for connecting a load, and including a bulk capacitor as an intermediate energy storage component. The auxiliary power converter connects to the input power source, having a first output connected to the output of the main power converter, and having a second output connected to the bulk capacitor of the main power converter. The control circuit is employed to control the main power converter and the auxiliary power converter.

The main power converter and the auxiliary power converter together supply power to the load when the load current is greater than a predetermined current level. The auxiliary power converter supplies power to the load and provides a regulated voltage to the bulk capacitor and the main power converter is disabled when the load current is smaller than the predetermined current level.

The input power source comprises a DC power source or an AC power source. The main power converter comprises a front-end stage and a DC/DC output stage. The front-end stage comprises a power-factor-correction (PFC) converter. The auxiliary power converter comprises a dual-switch flyback converter, voltage-doubler boost converter or flyback converter. Moreover, the main power converter comprises a single stage PFC converter.

Furthermore, the present invention provides a converter topology with low standby loss. The converter topology comprises a main power converter and an auxiliary power converter. The main power converter comprises a power factor corrector (PFC) converter, a bus capacitor and a DC/DC converter. The output side of the power factor corrector (PFC) converter connects in parallel with the DC/DC converter and the input side is connected to an AC input power source. The DC/DC converter connects to a DC output. The bus capacitor connects the power factor corrector (PFC) converter and the DC/DC converter. The auxiliary power converter connects to the input power source, having a first output connected to the output of the main power converter, and having a second output connected to the bulk capacitor of the main power converter.

The output voltage of the first output is more than that of the second output.

The auxiliary power converter comprises a transformer having a primary winding and a secondary winding, wherein substantial proportion of output voltage of the first output and the second output is determined by numbered ratio of coils of the primary winding and the secondary winding; a switch circuit connected to the primary winding for receiving a switching signal to switch; and a first rectifier circuit connected to the secondary winding for rectifying the output voltage of the second output.

The auxiliary power converter further comprises a second rectifier circuit connected to the primary winding for rectifying the output voltage of the first output. The switch circuit comprises at least one MOS transistor. The first and the second rectifier circuit comprise at least one diode rectifier.

The auxiliary power converter further comprises at least one first filter connected to the first rectifier circuit. The first filter comprises at least one first capacitor. The auxiliary power converter further comprises at least one second filter connected to the second rectifier circuit. The secondary winding comprises a first secondary winding and a second secondary winding.

BRIEF DESCRIPTION OF THE DRAWINGS

For a better understanding of the present invention and to show how it may be carried into effect, reference will now be made to the following drawings, which show the preferred embodiments of the present invention, in which:

FIG. 7 shows a converter topology of power supply with a single stage PFC converter according to the present invention.

DESCRIPTION OF THE PREFERRED EMBODIMENTS

In the following description, numerous specific details are set forth in order to provide a thorough understanding of the present invention, and the scope of the present invention is expressly not limited expect as specified in the accompanying claims. One skilled in the relevant art will recognize, however, that the invention may be practiced without one or more of the specific details. In other instances, well known structures, materials, or operations are not shown or described in order to avoid obscuring aspects of the invention.

Figure 1:
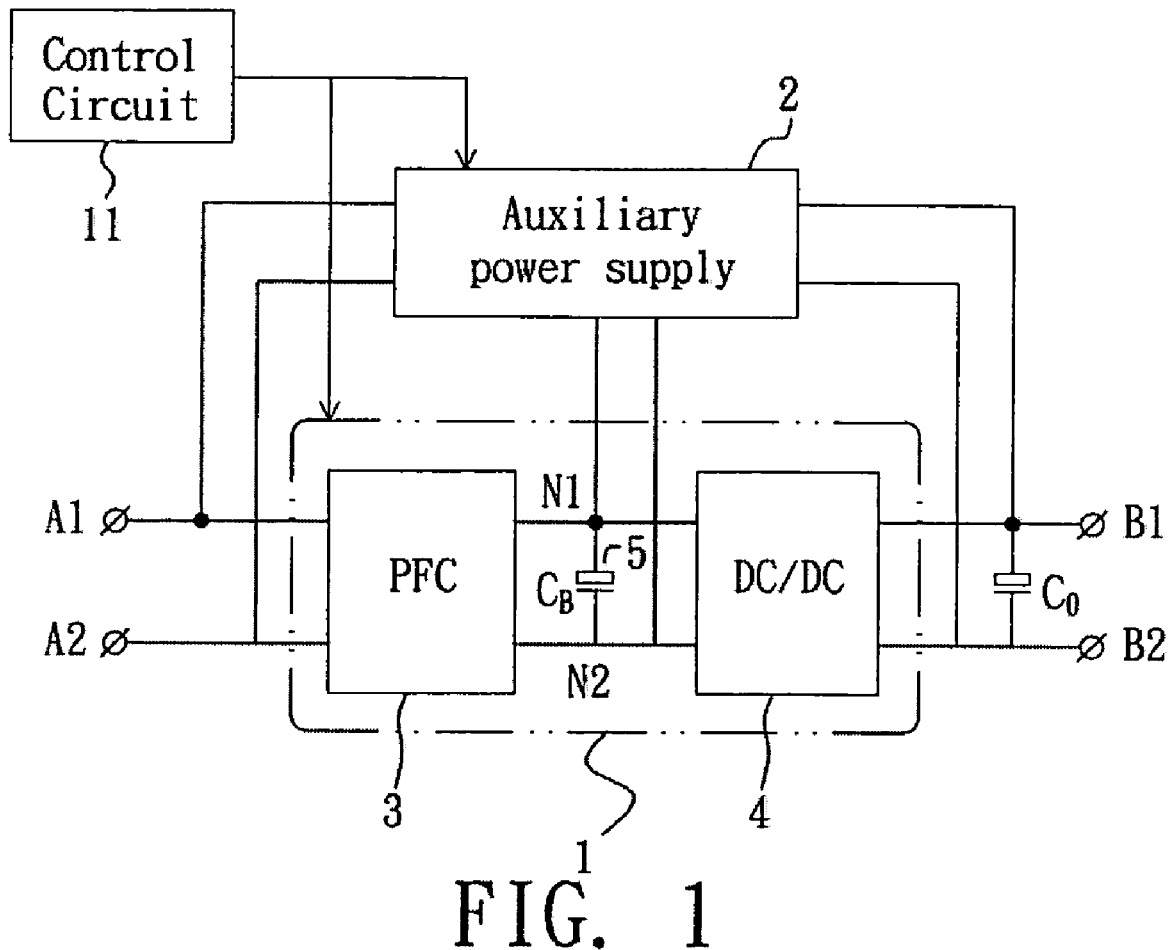
FIG. 1 shows a converter topology of power supply with low standby loss according to the present invention.

Those of ordinary skill in the art will immediately realize that the embodiments of the present invention described herein in the context of methods and schematics are illustrative only and are not intended to be in any way limiting. Other embodiments of the present invention will readily suggest themselves to such skilled persons having the benefits of this disclosure. FIG. 1 shows a converter topology of power supply with low standby loss of the present invention. The converter topology of the present invention may be applied to a high power converter but not limited to the high power converter, other stage power converter also applied to reach the goal with low standby loss. Shown in FIG. 1, the converter topology of the present invention comprises a main power converter 1 and an auxiliary power converter 2. The main power converter 1 comprises a power factor corrector (PFC) converter 3 and a DC/DC converter 4.

To meet the high switching efficiency and high power density requirements of a switching mode power source, the optimization point for efficiency in designing the main power converter 1 is in the vicinity of full loading. Therefore, the efficiency of the main power converter 1 at a light loading is relatively low. If the main power converter 1 of the power supply device provides the necessary power in the standby mode, the amount of energy wasted will be significant. Since the auxiliary power converter 2 has a low power output, the auxiliary power converter 2 can be optimized for efficiency at the standby mode such that the amount of energy loss in the standby mode is minimized. When the power supply device operates in the normal operating mode, the DC/DC converter 4 and the auxiliary power converter 2 together provide a first output power to an output load. In the standby mode, the DC/DC converter 4 is disabled to reduce standby loss and the auxiliary power converter 2 provides a second output power to the output load and maintains a stable voltage in the capacitor $C_B$ for meeting the demand of dynamic response to the output load. In the initial stage of returning to the normal operating mode, the capacitor $C_B$ provides the necessary stable voltage for power switching of the DC/DC converter 4.

The scheme of the present invention is adapted that the main power converter 1 and the auxiliary power converter 2 are connected in parallel, as shown in FIG. 1. The main power converter 1 comprises two-stage structure including a front-end stage converter 3 and a DC/DC output stage converter 4. The front-end stage converter 3 comprises a power-factor-correction converter 3. For example, the auxiliary power converter 2 comprises dual-switch flyback converter, voltage-doubler boost converter or flyback converter. Moreover, the capacitor ($C_B$) 5 such as bulk capacitor is employed as an output bus capacitor of the power-factor-correction converter 3 for storing energy and stabilizing voltage. The main power converter 1 and the auxiliary power converter 2 are connected in parallel at nodes A1, A2 and B1, B2. The nodes A1, A2 represent the input terminals of the switching mode power source. Typically, the nodes A1 and A2 are connected to an alternating current power source. The nodes B1, B2 represent the output terminals of the switching mode power source. Typically, the nodes B1 and B2 are connected to an output load. In general, the output load is connected to a direct current power source. Therefore, the auxiliary power converter 2 provides dual outputs. The first output of the auxiliary power converter 2 is connected to nodes B1, B2, and second output of the auxiliary power converter 2 is connected to nodes N1, N2. The high voltage of the auxiliary power converter 2 is output at the nodes N1, N2 of the main power converter 1, and low voltage of the auxiliary power converter 2 is output at the nodes B1, B2 of the main power converter 1 with good cross regulation. The nodes N1, N2 connect to terminals of the output bus capacitor 5 of the power-factor-correction converter 3. Moreover, a filter such as capacitor Co may be optionally connected to the output for filtering output voltage noise. The filter comprises but not limited to a capacitor, others inductance and capacitor combination are also applied to the present invention.

Strategy of the present invention in the standby mode is adapted that the auxiliary power converter 2 provides for the standby load and the power-factor-correction converter 3 and the DC/DC converter 4 is disabled to reduce standby loss. In other words, the auxiliary power converter 2 provides one power source for supporting the load and another power source to maintain a stable voltage in the bus capacitor ($C_B$) 5 for meeting the demand of dynamic response to the output load. Besides, since the auxiliary power converter 2 has a low power output, the auxiliary power converter 2 can be optimized for efficiency at the standby mode such that the amount of energy loss in the standby mode is minimized. The working mode of the present invention comprises: 1. in the standby mode, the main power converter 1 is disabled and the auxiliary power converter 2 provides all output power and maintains a stable voltage in the capacitor $C_B$ for meeting the demand of dynamic response to the output load; 2. in the normal operating mode, the main power converter 1 and the auxiliary power converter 2 together supply power, most of the output power is provided by the main power converter 1 and the maximum output power of the auxiliary power converter is confined to or less than a limited value. In other words, the main power converter 1 and the auxiliary power converter 2 together supply power to the load when the load current is greater than a predetermined current level. The auxiliary power converter 2 supplies power to the load and provides a regulated voltage to the bulk capacitor 5 and the main power converter 1 is disabled when the load current is smaller than the predetermined current level. The control circuit 11 may be employed to control the main power converter 1 and the auxiliary power converter 2 to achieve the above-mentioned working mode.

Figure 2:
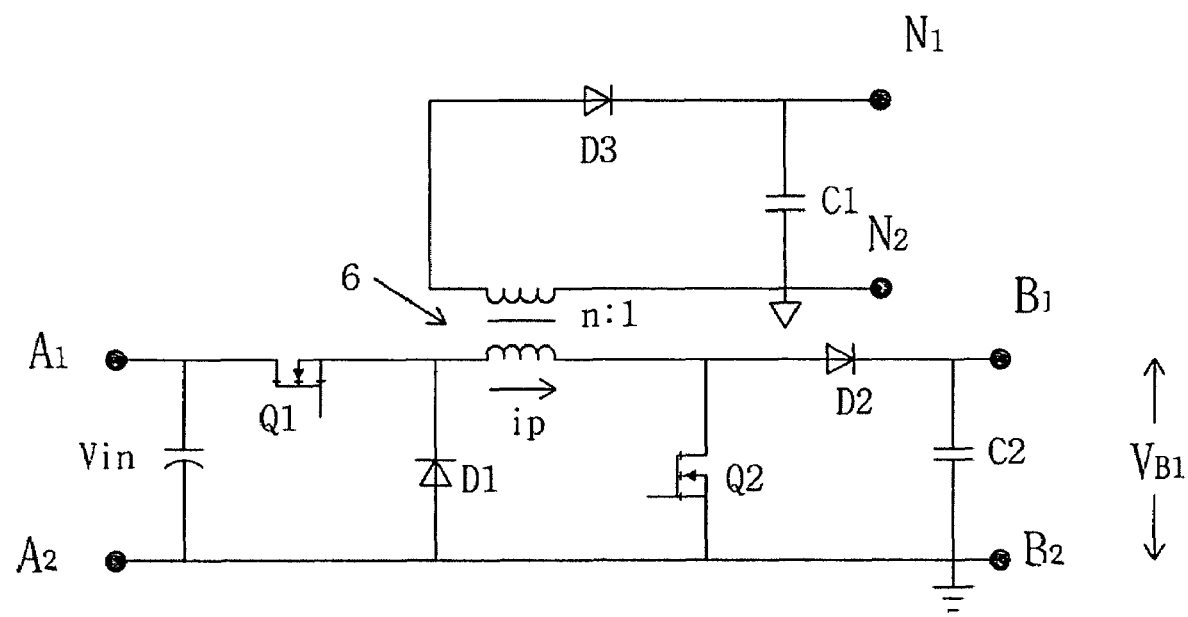
FIG. 2 shows a topology of the auxiliary power converter according to the first preferred embodiment of the present invention.

FIG. 2. shows a topology of the auxiliary power converter according to the first preferred embodiment of the present invention. The auxiliary power converter comprises a transformer 6 having a primary winding and a secondary winding; a switch circuit including switch transistors (in general MOSFET) Q1 and Q2, connected to the primary winding for receiving a switching signal to perform a switching act; a first rectifier circuit including rectifier diodes D1 and D2, connected to the primary winding for rectifying the output voltage of the second output VB1; and a second rectifier circuit including rectifier diode D3, connected to the secondary winding for rectifying the output voltage of the first output Vo1.

Figure 3:
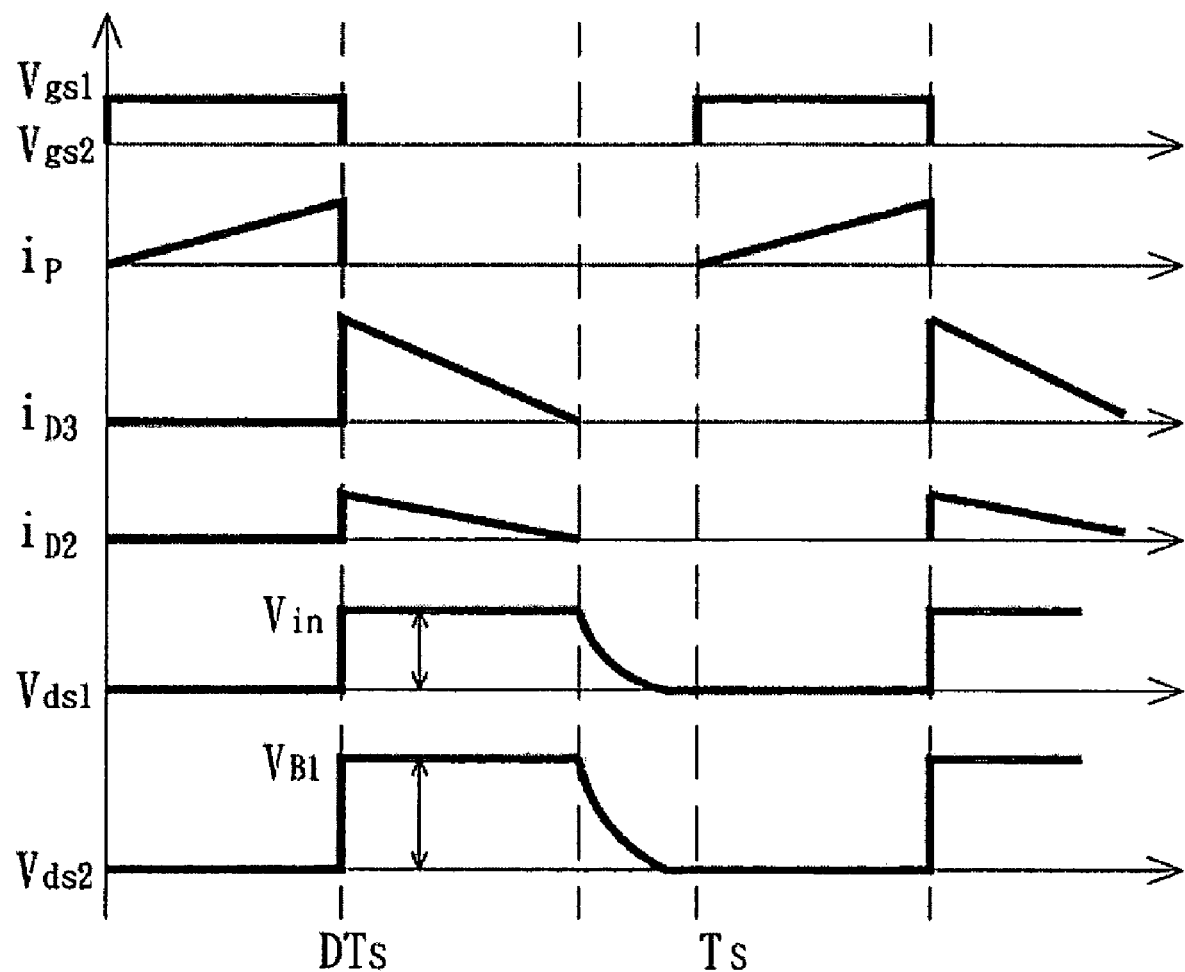
FIG. 3 shows a waveform diagram of the voltage/current of the auxiliary power converter of the FIG. 2 according to the first preferred embodiment of the present invention.

The operational principle of the auxiliary power converter hereby describes in details below. Shown in FIG. 2, the auxiliary power converter 2 connects the input of an alternating power source Vin connected to input of the power-factor-correction converter 3 in practical application. In the present embodiment, the auxiliary power converter has two switch transistors (in general MOSFET) Q1 and Q2, and transistors Q1, Q2 are controlled by the same impulse signal for alternately performing turning on/off act. Moreover, three rectifier diodes D1, D2 and D3 are employed rectifying the output voltage of VB1 and Vo1. The transformer 6 with voltage ratio n comprises a primary winding and a secondary winding. In other words, numbered ratio of coils of the primary winding and the secondary winding is n:1. According to output principle of transformer, proportion of output voltage of the first output VB1 and the second output Vo1 is substantially n:1 (VB1=n*Vo1). Therefore, the auxiliary power converter produces dual output of high voltage output VB1 and low voltage output Vo1. Since the Q1, Q2 are controlled by the same impulse signal, voltage stress of the Q1, Q2 are clamped to input and the high voltage output, shown in FIG. 3. DTs and Ts represent a breakdown time and a switching time of transistor respectively. Vgs1 and Vgs2 represent a breakdown voltage of the transistors Q1, Q2 at high voltage respectively, and Vds1 and Vds2 represent a breakdown voltage of the transistors Q1, Q2 at low voltage respectively. $i_p$, $i_{D3}$ and $i_{D2}$ represent breakdown currents of the primary winding of the transformer 6, rectifier diodes D3 and D2 respectively. Furthermore, between the primary winding and the secondary winding of the transformer 6 has the properties of small voltage difference, low insulation demand, small leakage and good cross regulation, and the leakage energy transferring to high voltage output, therefore benefits for promoting whole efficiency of circuit.

In addition, a filter such as capacitor C1 and C2 may be optionally connected to the output of the high voltage output VB1 and low voltage output Vo1 for filtering output voltage noise. The above filter comprises but not limited to a capacitor, others inductance and capacitor combination are also applied to the present invention FIG. 4. shows a topology of the auxiliary power converter according to the second preferred embodiment of the present invention. The auxiliary power converter comprises a transformer 7 having a primary winding and a secondary winding; a switch circuit including switch transistors (in general MOSFET) Q1 and Q2, connected to the primary winding for receiving a switching signal to perform a switching act; and a rectifier circuit including rectifier diodes D1 and D2, connected to the second winding for rectifying the output voltage of the output Vo1.

Figure 4:
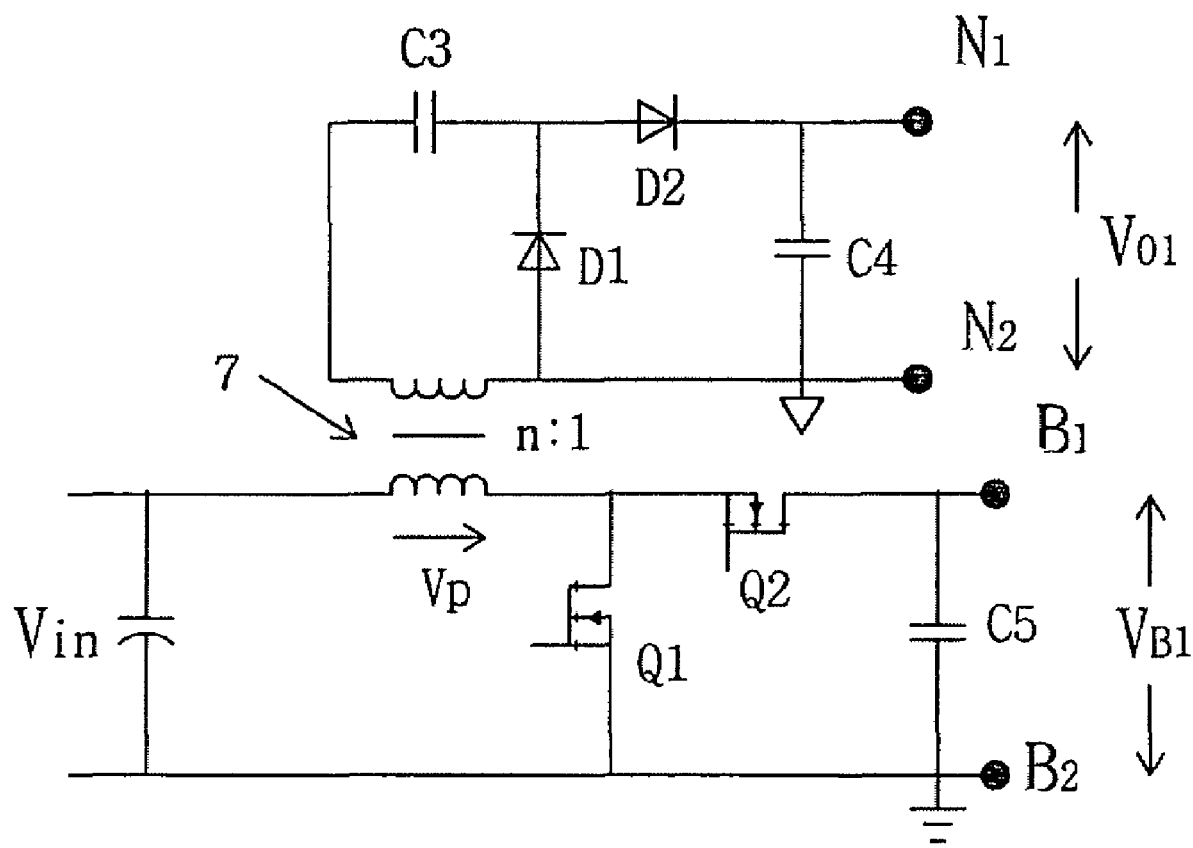
FIG. 4 shows a topology of the auxiliary power converter according to the second preferred embodiment of the present invention.
Figure 5:
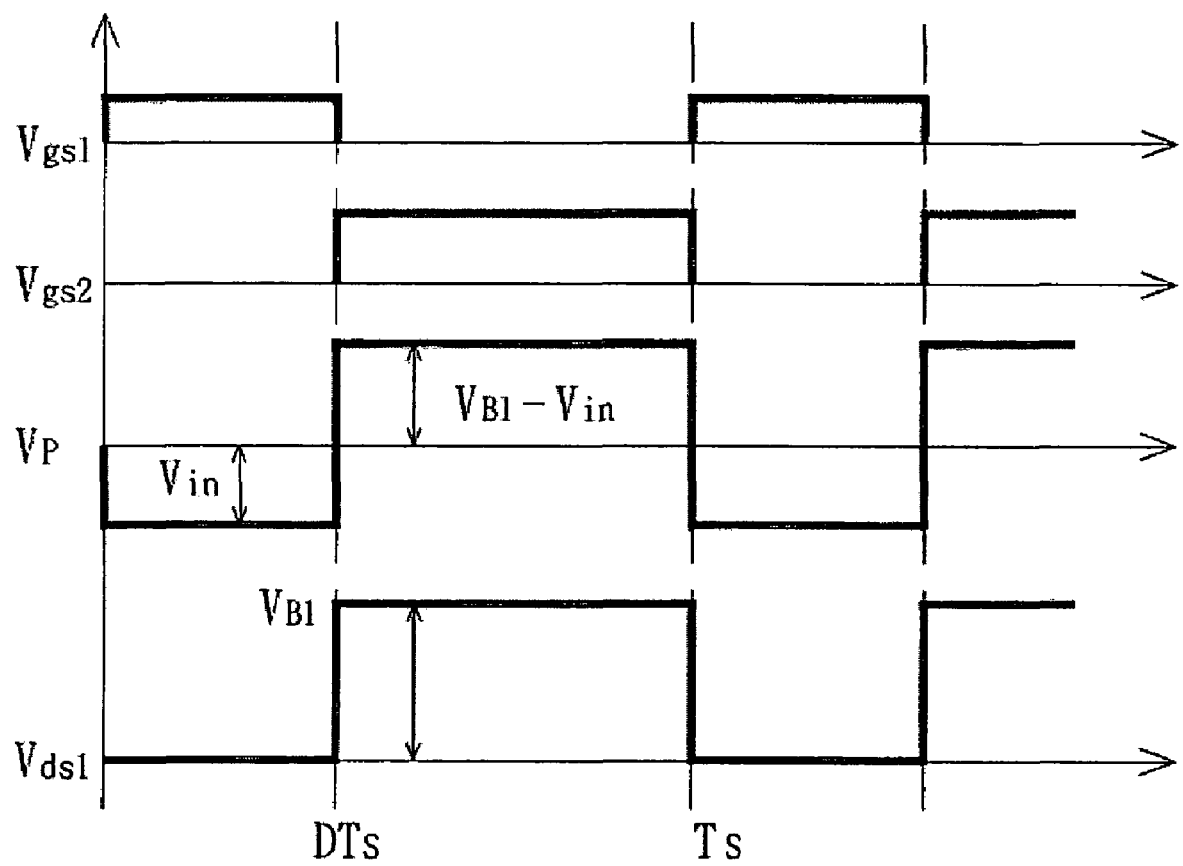
FIG. 5 shows a waveform diagram of the voltage/current of the auxiliary power converter of the FIG. 4 according to first preferred embodiment of the present invention.

Similarly, shown in FIG. 4, the auxiliary power converter 2 connects the input of an alternating power source Vin. In the present embodiment, the auxiliary power converter has two switch transistors (in general MOSFET) Q1 and Q2, and transistors Q1, Q2 are controlled by the complementary impulse signal for alternately performing turning on/off act. Moreover, the rectifier diodes D1, D2 are employed rectifying the output voltage Vo1. The transformer 6 has voltage ratio n, and therefore proportion of output voltage of the first output VB1 and the second output Vo1 is substantially n:1 (VB1=n*Vo1). Therefore, the auxiliary power converter produces dual output of high voltage output VB1 and low voltage output Vo1. Since the Q1, Q2 are controlled by the complementary impulse signal, voltage stress of the Q1, Q2 are clamped to the high voltage output, shown in FIG. 5. Vp represents the voltage of the transformer. Furthermore, between the primary winding and the secondary winding of the transformer 7 has the properties of small voltage difference, low insulation demand, small leakage and good cross regulation, and the leakage energy transferring to high voltage output, therefore benefits for promoting whole efficiency of circuit.

Moreover, a filter such as capacitor C3, C4 and C5 may be optionally connected to output of the low voltage output Vo1 and the high voltage output VB1 for filtering output voltage noise.

Figure 6:
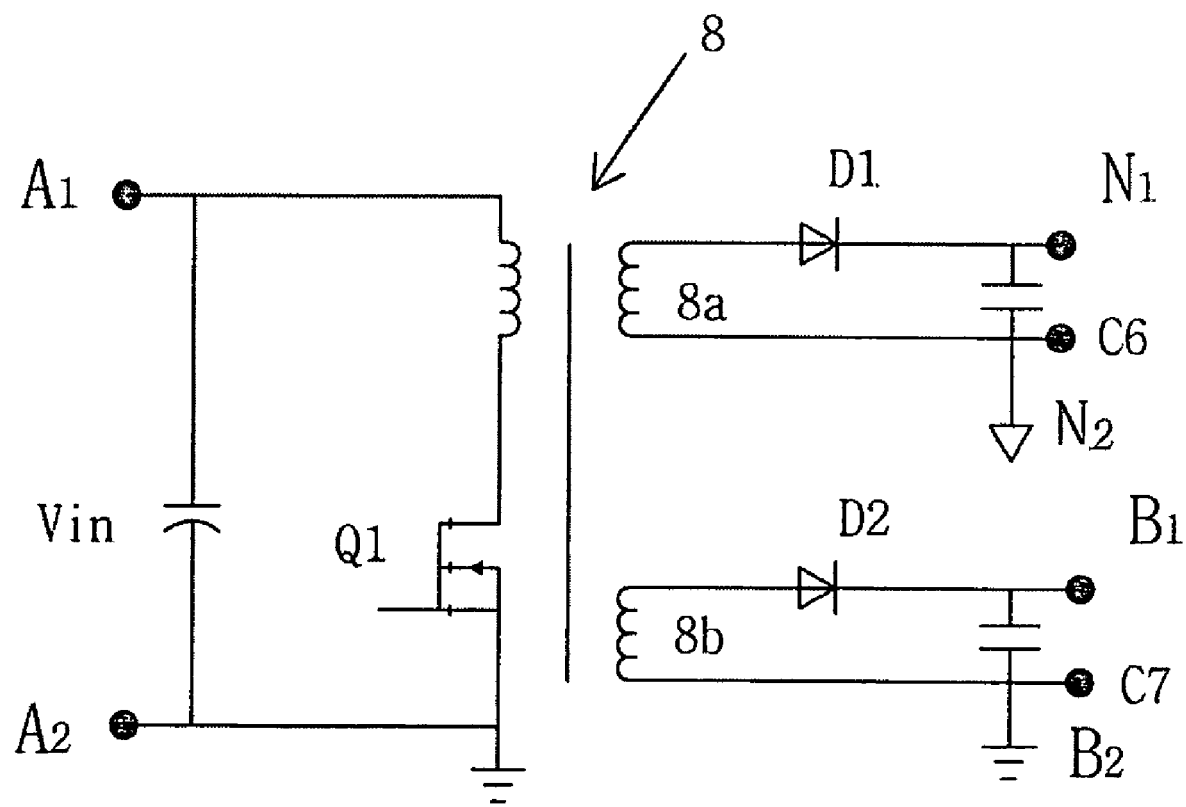
FIG. 6 shows a topology of the auxiliary power converter according to the third preferred embodiment of the present invention.

FIG. 6 shows a topology of the auxiliary power converter according to the third preferred embodiment of the present invention. The auxiliary power converter comprises a transformer 8 having a primary winding and two secondary winding 8a, 8b; a switch device including switch transistors (in general MOSFET) Q1, connected to the primary winding for receiving a switching signal to perform a switching act; and two rectifier diodes D1 and D2, connected to two secondary winding 8a, 8b respectively for rectifying the output voltage of the output Vo1 and VB1.

Shown in FIG. 6, the auxiliary power converter 2 connects the input of an alternating power source Vin. In the present embodiment, the auxiliary power converter has a switch transistor Q1 for performing turning on/off act. Moreover, the rectifier diodes D1, D2 are employed rectifying the output voltage Vo1 and VB1 respectively. The transformer 8 comprises a primary winding and two secondary winding 8a, 8b. Similarly, proportion of output voltage of the first output VB1 and the second output Vo1 is substantially determined by voltage ratio of the transformer 8. Therefore, the auxiliary power converter also produces dual output of high voltage output VB1 and low voltage output Vo1. In the present embodiment, flyback topology is applied to facilitate producing the high voltage output and low voltage output.

Similarly, a filter such as capacitor C6 and C5 may be optionally connected to output of the low voltage output Vo1 and the high voltage output VB1 for filtering output voltage noise.

FIG. 7 shows a converter topology of power supply with a single stage PFC converter according to the present invention. The single stage PFC converter 10 comprises an energy storage capacitor $C_B$ connected to an auxiliary power converter 9. The auxiliary power converter 9 has a first terminal connected to input power source and a second terminal connected to a filter capacitor Co. Moreover, an impedance matching device Z connects to the filter capacitor Co and a load.

The auxiliary power converter 9 supplies power to the load and provides a regulated voltage to the energy storage capacitor $C_B$ when the load current is smaller than the predetermined current level (in a standby mode). When the power supply transfers from the standby mode to a normal operating mode, the energy storage capacitor $C_B$ may store a stable voltage for dynamic response of the standby mode transferring to the normal operating mode of the power converter. Therefore, auxiliary power converter 9 is employed to provide storing energy of the energy storage capacitor $C_B$ such that the power supply can meet the demand of dynamic response to the output load. In other words, others application necessary for energy storage capacitor and stable storage voltage may be applied to the present invention.

Therefore, in contrast with the prior art hardly meeting the more stringent requirements for standby mode in switching mode power source, the present invention provides a new scheme to achieve stringent demand of standby loss, high switching efficiency, low cost and fast dynamic response to a load.

As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and similar arrangements included within the spirit and scope of the appended claims, the scope of which should be accorded the broadest interpretation so as to encompass all such modifications and similar structures. While the preferred embodiment of the invention has been illustrated and described, it will be appreciated that various changes can be made therein without departing from the spirit and scope of the invention.

What is claimed is:

1. A power supply comprising:
    a main power converter connected to an input power source, having at least one output filter capacitor for connecting a load, and further including a bulk capacitor as an intermediate energy storage component;
    an auxiliary power converter connected to said input power source in parallel, having a first output connected to said output filter capacitor of said main power converter, and having a second output connected to said bulk capacitor of said main power converter; and
    a control circuit to control said main power converter and said auxiliary power converter; wherein said auxiliary power converter includes:
    an input-filter capacitor;
    a first output-filter capacitor connected across said first output;
    a second output-filter capacitor connected across said second output;
    a transformer having a primary winding and a secondary winding, one terminal of said secondary winding connected to the negative terminal of said first output-filter capacitor;
    two switches periodically coupling and decoupling said primary winding and said input-filter capacitor;
    two rectifiers coupling said primary winding and said second output-filter capacitor; and
    a third rectifier coupling said secondary winding and said first output-filter capacitor.

2. A power supply as in claim 1, wherein said main power converter and said auxiliary power converter supply power to said load when the load current is greater than a predetermined current level.

3. A power supply as in claim 2, wherein said auxiliary power converter supplies power to said load and provides a regulated voltage to said bulk capacitor when the load current is smaller than said predetermined current level.

4. A power supply as in claim 3, wherein said main power converter is disabled.

5. A power supply as in claim 1, wherein said input power source comprises a DC power source.

6. A power supply as in claim 1, wherein said input power source comprises an AC power source.

7. A power supply as in claim 1, wherein said main power converter comprises a front-end stage and a DC/DC output stage.

8. A power supply as in claim 7, wherein said front-end stage comprises a power-factor-correction converter.

9. A power supply as in claim 1, wherein said main power converter comprises a single-stage PFC converter.

10. A power supply as in claim 1, wherein a substantial proportion of voltages of said second output and said first output of said auxiliary power converter is determined by the turns ratio of said primary winding and said secondary winding of said transformer.

11. A power supply comprising:

a main power converter connected to an input power source, having at least one output filter capacitor for connecting a load, and further including a bulk capacitor as an intermediate energy storage component;

an auxiliary power converter connected to said input power source in parallel, having a first output connected to said output filter capacitor of said main power converter, and having a second output connected to said bulk capacitor of said main power converter; and a control circuit to control said main power converter and said auxiliary power converter; wherein said auxiliary power converter includes:

an input-filter capacitor;

a first output filter capacitor connected across said first output;

a second output filter capacitor connected across said second output;

a transformer having a primary winding and a secondary winding, wherein, one terminal of said primary winding is connected to the positive terminal of said input-filter capacitor, and one terminal of said secondary winding is connected to the negative terminal of said first output-filter capacitor;

a switch periodically coupling and decoupling said primary winding and said input-filter capacitor;

a first rectifier coupling said primary winding and said second output-filter capacitor;

a fourth capacitor, one terminal of said fourth capacitor connected to the other terminal of said secondary winding;

a second rectifier coupling said fourth capacitor and said secondary winding; and a third rectifier coupling said fourth capacitor and said first output-filter capacitor.

12. A power supply as in claim 11, wherein a substantial proportion of voltages of said second output and said first output of said auxiliary power converter is determined by the turns ratio of said primary winding and said secondary winding of said transformer.

* * * * *